United States Patent
Chen et al.

(10) Patent No.: US 9,914,815 B2
(45) Date of Patent: *Mar. 13, 2018

(54) BLOWING AGENT COMPOSITION OF HYDROCHLOROFLUOROOLEFIN AND HYDROFLUOROOLEFIN

(71) Applicant: Arkema Inc., King of Prussia, PA (US)

(72) Inventors: Benjamin Bin Chen, Wayne, PA (US); Joseph S. Costa, Gilbertsville, PA (US); Philippe Bonnet, Lyons (FR); Maher Y. Elsheikh, Wayne, PA (US); Brett L. Van Horn, King of Prussia, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/015,184

(22) Filed: Feb. 4, 2016

(65) Prior Publication Data

US 2016/0152787 A1    Jun. 2, 2016

Related U.S. Application Data

(62) Division of application No. 12/532,202, filed as application No. PCT/US2008/058607 on Mar. 28, 2008, now Pat. No. 9,279,039.

(60) Provisional application No. 60/908,751, filed on Mar. 29, 2007.

(51) Int. Cl.
  *C08J 9/14* (2006.01)
  *C08G 18/06* (2006.01)
  *B01F 17/00* (2006.01)

(52) U.S. Cl.
  CPC ............ *C08J 9/144* (2013.01); *B01F 17/0085* (2013.01); *C08G 18/06* (2013.01); *C08J 9/146* (2013.01); *C08J 9/149* (2013.01); *C08J 2203/142* (2013.01); *C08J 2203/162* (2013.01); *C08J 2203/182* (2013.01); *C08J 2300/104* (2013.01); *C08J 2300/106* (2013.01); *C08J 2375/04* (2013.01)

(58) Field of Classification Search
None
See application file for complete search history.

(56) References Cited

U.S. PATENT DOCUMENTS

| 2005/0233932 A1 | 10/2005 | Singh et al. |
| 2007/0010592 A1 | 1/2007 | Bowman et al. |

FOREIGN PATENT DOCUMENTS

| JP | 3034941 A | 2/1991 |
| WO | WO 2006/069362 A2 | 6/2006 |
| WO | WO 2006/094303 A2 | 9/2006 |

OTHER PUBLICATIONS

Kennth Denbigh, The Principles of Chemical Equilibrium, 4th Edition, Cambridge University Press ISBN 0 521 28150; pp. 222 & 246.

Walter J. Moore; Professor of Physical Chemistry, The University of Sydney; "Physical Chemistry" 4th Edition; Prentice Hall Inc., 1972 ISBN 0-13-665968-3 Englewood Cliffs, New Jersey, pp. 254-255.

*Primary Examiner* — Kara B Boyle
(74) *Attorney, Agent, or Firm* — Steven D. Boyd

(57) ABSTRACT

A blowing agent for thermosetting foams is disclosed. The blowing agent is a hydrofluoroolefin (HCFO), preferably HFCO-1234yf in combination with a hydrochlorofluoroolefin (HCFO) preferably one selected from HCFO-1233zd, HCFO-1223, HCFO-1233xf and mixtures thereof. The blowing agent is effective as a blowing agent in the manufacture of thermosetting foams.

2 Claims, No Drawings

BLOWING AGENT COMPOSITION OF HYDROCHLOROFLUOROOLEFIN AND HYDROFLUOROOLEFIN

This application is a divisional of U.S. patent application Ser. No. 12/532,202 filed Sep. 21, 2009, which is the national phase under 35 USC § 371 of prior PCT International Application Number PCT/US2008/058607, filed Mar. 28, 2008, which designated the United States and which claims priority to U.S. provisional patent application Ser. No. 60/908,751, filed Mar. 29, 2007.

FIELD OF THE INVENTION

The present invention relates to blowing agents for thermosetting foams. More particularly, the present invention relates to the use of at least one hydrofluoroolefin such as HFO-1234yf in combination with at least one hydrochlorofluoroolefin (HCFO) such as HCFO-1223, HCFO-1233zd, HCFO-1233xf and mixtures thereof as a blowing agent in the manufacture of thermosetting foams.

BACKGROUND OF THE INVENTION

The Montreal Protocol for the protection of the ozone layer, signed in October 1987, mandated the phase out of the use of chlorofluorocarbons (CFCs). Materials more "friendly" to the ozone layer, such as hydrofluorocarbons (HFCs) eg HFC-134a replaced chlorofluorocarbons. The latter compounds have proven to be green house gases, causing global warming and were regulated by the Kyoto Protocol on Climate Change, signed in 1998. The emerging replacement materials, hydrofluoropropenes, were shown to be environmentally acceptable i.e. has zero ozone depletion potential (ODP) and acceptable low global warming potential (GWP).

Currently used blowing agents for thermoset foams include HFC-134a, HFC-245fa, HFC-365mfc that have relatively high global warming potential, and hydrocarbons such as pentane isomers flammable and have low energy efficiency. Therefore, new alternative blowing agents are being sought. Halogenated hydroolefinic materials such as hydrofluoropropenes and/or hydrochlorofluoropropenes have generated interest as replacements for HFCs. The inherent chemical instability of these materials in the lower atmosphere provides the low global warning potential and zero or near zero ozone depletion properties desired.

The object of the present invention is to provide novel compositions that can serve as blowing agents for thermosetting foams that provide unique characteristics to meet the demands of low or zero ozone depletion potential, lower global warming potential and exhibit low toxicity.

SUMMARY OF THE INVENTION

The present invention relates to the use of blowing agents with negligible (low or zero) ozone-depletion and low global warming potential based upon unsaturated halogenated hydroolefins. The blowing agents comprise at least one hydrofluoroolefin preferably (HFO) HFO-1234yf in a combination with at least one hydrochlorofluoroolefin (HCFO) such as HCFO-1223, HCFO-1233zd, HCFO-1233xf and mixtures thereof. HFO-1234yf is 2,3,3,3-tetrafluoropropene; HCFO 1223 is dichlorotrifluoropropene; HCFO-1233zd is 1-chloro-3,3,3-trifluoropropene; HCFO1233xf is 2-chloro-3,3,3-trifluoropropene. The composition can further comprise an additional hydrofluoroolefin (HFO), a hydrofluorocarbon, a hydrocarbon, an alcohol, an ester, an aldehyde, a ketone ether/diether, carbon dioxide and mixtures thereof.

Hydrofluoroolefin (HFO) materials have been proposed as blowing agents which exhibit a low global warming potential and a low ozone depletion value. The low global warming potential and a low ozone depletion value are a result of the atmospheric degradation of the hydrofluoroolefins.

The hydrofluoroolefin, preferably HFO-1234yf in combination with a hydrochlorofluoroolefin (HCFO) preferably selected from HCFO-1223, HCFO-1233zd, HCFO-1233xf and mixtures thereof combination can be used as a foaming agent for thermosetting foams by being mixed in a polyols mixture. The resulted products show superior quality including decreased density and improved k-factor. The foaming agent dissolves in thermosetting polymers, and provides a degree of plasticization sufficient to produce acceptable foams.

The preferred blowing agent composition, hydrofluoroolefin, preferably HFO-1234yf in combination with a hydrochlorofluoroolefin (HCFO) preferably selected from HCFO-1223, HCFO-1233zd, HCFO-1233xf and mixtures thereof of the present invention exhibits good solubility in polyol mixture used in producing polyurethane and polyisocyanurate foams. A preferred ratio of the hydrofluoroolefin, preferably HFO-1234yf component in combination with a hydrochlorofluoroolefin (HCFO) preferably selected from HCFO-1223, HCFO-1233zd, HCFO-1233xf and mixtures thereof is more than about 5 wt % hydrofluoroolefin.

The hydrofluoroolefin, preferably HFO-1234yf in combination with a hydrochlorofluoroolefin (HCFO) preferably selected from HCFO-1223, HCFO-1233zd, HCFO-1233xf and mixtures thereof composition of the present invention may be used in combination with low or zero ozone depletion value materials including but not limited to: (a) hydrofluorocarbons including but not limited to difluoromethane (HFC32); 1,1,1-trifluoroethane (143a); 1,1,1,2,2-pentafluoroethane (HFC125); 1,1,2,2-tetrafluoroethane (HFC134); 1,1,1,2-tetrafluoroethane (HFC134a); 1,1-difluoroethane (HFC152a); 1,1,1,2,3,3,3-heptafluoropropane (HFC227ea); 1,1,1,3,3-pentafluoropropane (HFC245fa); 1,1,1,3,3-pentafluorobutane (HFC365mfc) and 1,1,1,2,2,3,4,5,5,5-decafluoropentane (HFC4310mee). (b) additional hydrofluoroolefins, other than HFO-1234yf, including but not limited to tetrafluoropropenes such as HFO1234ze; trifluoropropenes such as HFO1243zf, all tetrafluorobutene isomers (HFO1354), all pentafluorobutene isomers (HFO1345), all hexafluorobutene isomers (HFO1336), all heptafluorobutene isomers (HFO1327), all heptafluoropentene isomers (HFO1447) all octafluoropentene isomers (HFO1438), all nonafluoropentene (HFO1429) (c) hydrocarbons including but not limited to, pentane isomers, butane isomers, (d) C1 to C5 alcohols, C1 to C4 aldehydes, C1 to C4 esters, C1 to C4 ketones, C1 to C4 ethers and diethers and carbon dioxide The foamable compositions of the present invention generally includes one or more components capable of forming foam having a generally cellular structure and a blowing agent, typically in a combination, in accordance with the present invention. In certain embodiments, the one or more components comprise a thermosetting composition capable of forming foam and/or foamable compositions. Examples of thermosetting compositions include polyurethane and polyisocyanurate foam compositions, and also phenolic foam compositions. In such thermosetting foam embodiments, one or more of the present compositions are included as or part of a blowing agent in a foamable composition, or as a part of a two or more part foamable composition, which preferably includes one or more of the components capable of reacting and/or foaming under the proper conditions to form a foam or cellular structure.

The invention also relates to foam, and preferably closed cell foam, prepared from a polymer foam formulation containing a blowing agent comprising the compositions of the invention. In yet other embodiments, the invention provides foamable compositions comprising thermosetting foams, such as polyurethane and polyisocyanurate foams, preferably low-density foams, flexible or rigid.

It will be appreciated by those skilled in the art that the order and manner in which the blowing agent combination of the present invention is formed and/or added to the foamable composition does not generally affect the operability of the present invention. For example, in the case of polyurethane foams, it is possible that the various components of the blowing agent combination, and even the components of the present composition, not be mixed in advance of introduction to the foaming equipment, or even that the components are not added to the same location in the foaming equipment. Thus, in certain embodiments it may be desired to introduce one or more components of the blowing agent combination in a blender with the expectation that the components will come together in the foaming equipment and/or operate more effectively in this manner. Nevertheless, in certain embodiments, two or more components of the blowing agent combination are combined in advance and introduced together into the foamable composition, either directly or as part of premix that is then further added to other parts of the foamable composition.

Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly.

The invention claimed is:

1. A polymer blowing agent composition for thermosetting foams consisting of (a) about 5 wt % or more HFO-1234yf, (b) HCFO-1233zd, and (c) carbon dioxide.

2. A foam forming composition comprising a polyol mixture and the polymer blowing agent composition of claim 1.

\* \* \* \* \*